(12) United States Patent
Hostetter (10) Patent No.: US 8,665,563 B2
(45) Date of Patent: Mar. 4, 2014

(54) MAGNETIC TAPE PARTITIONING FORMAT FOR USE IN LINEAR RECORDING OF FIXED PARTITIONS

(75) Inventor: David G. Hostetter, Louisville, CO (US)

(73) Assignee: Oracle International Corporation, Redwood City, CA (US)

( * ) Notice: Subject to any disclaimer, the term of this patent is extended or adjusted under 35 U.S.C. 154(b) by 175 days.

(21) Appl. No.: 13/440,054

(22) Filed: Apr. 5, 2012

(65) Prior Publication Data

US 2013/0265669 A1    Oct. 10, 2013

(51) Int. Cl.
*G11B 5/78* (2006.01)
*G11B 5/584* (2006.01)

(52) U.S. Cl.
USPC ............................ 360/134; 360/77.12; 360/48

(58) Field of Classification Search
USPC ......... 360/55, 60, 134, 75, 13, 66, 72.1, 74.1, 360/121, 241.1, 49, 48, 22, 77.12, 77.13, 360/90, 83, 72.3
See application file for complete search history.

(56) References Cited

U.S. PATENT DOCUMENTS

| | | | |
|---|---|---|---|
| 5,710,676 A | 1/1998 | Fry et al. | |
| 5,969,893 A | 10/1999 | Basham et al. | |
| 7,236,322 B2 * | 6/2007 | Greco et al. | 360/75 |
| 7,978,429 B2 | 7/2011 | Biskeborn | |
| 8,027,109 B1 | 9/2011 | Lyman | |
| 8,068,303 B2 | 11/2011 | Jaquette | |
| 8,488,275 B2 * | 7/2013 | Biskeborn et al. | 360/134 |

OTHER PUBLICATIONS

Amer, Ahmed, "Design Issues for a Shingled Write Disk System," Institute of Electrical and Electronics Engineers, 2010.

* cited by examiner

*Primary Examiner* — Ali Neyzari
(74) *Attorney, Agent, or Firm* — Marsh Fischmann & Breyfogle, LLP; Jonathon A. Szumny; Kent A. Lembke (57) ABSTRACT

A partitioning format for magnetic tape media that includes at least a first portion (e.g., a file directory) having a plurality of dynamically updateable (e.g., non-shingled) partitions and a second portion (e.g., a data portion) having a plurality of linearly or sequentially written shingled partitions. Use of both shingled and non-shingled partitions on the same length of magnetic tape allows for an increase in capacity over those applications that perform linear recording of non-shingled partitions while allowing for the dynamic updating of a local file directory free of disturbing the linearly written data of the shingled partitions.

19 Claims, 8 Drawing Sheets

MAGNETIC TAPE PARTITIONING FORMAT FOR USE IN LINEAR RECORDING OF FIXED PARTITIONS

BACKGROUND

1. Field of the Invention

The present invention generally relates to the storing of data on magnetic tape media and, more particularly, to a partitioning or wrapping format that increases magnetic tape storage capacity for applications utilizing linear recording of fixed partitions.

2. Relevant Background

The market for mass storage devices is growing at what seems to be an ever increasing rate with the sales of high-performance computers penetrating numerous industries ranging from financial institutions to oil exploration companies. The processing power of these high-performance systems, and the data they generate, are increasing faster than the ability of storage devices to keep pace. The problem of data storage and rapid retrieval is particularly pronounced in computational-intensive applications which create huge amounts of data that need to be accessed in seconds rather than minutes, hours or even days.

Magnetic disks remain the preferred media for direct access to frequently used files because of their fast access times. However, because of their high cost per-unit of storage and limited capacity, magnetic disk recorders are prohibitively expensive and therefore impractical for large-scale data storage. With the advances in magnetic tape technology, tape based systems remain the preferred choice for mass data storage. In addition to cost, magnetic tape exceeds the storage density of almost any other medium, at least from a volumetric standpoint, because tape is a much thinner medium than, for example, magnetic disks, and tape can be tightly packed.

Magnetic tape is a magnetic recording medium made of a thin magnetizable coating on a long, narrow strip of plastic which is typically stored in the form of a spool on a cartridge or cassette. Typically, magnetic tape includes multiple, parallel tracks for reading data from or writing data to the tape in one of a number of manners. In "linear" or "longitudinal" reading or recording, data is read or recorded by moving from a starting point on the first track of the tape and moving linearly down the tape along the first track or along a first path. Once the physical end of the tape (EOT) is reached, the tape is rewound to the beginning of the tape (BOT) at which point the read/record head assembly begins reading or recording linearly down the tape along the second track or along a second path. In a variation of the linear method known as "serpentine" reading and recording, the head assembly first spans the tape's entire length in one direction along one track or path and then return in the opposite direction along an adjacent parallel track or path (and then continues sweeping back and forth along the tape). In another variation of the linear method known as "spiral in" reading and recording, the head assembly first spans the tape's entire length in a first direction along a first track or path adjacent one outer lateral edge of the tape, returns in the opposite direction along a second track or path adjacent the other lateral edge of the tape, spans the tape in the first direction again along a third track or path adjacent the first track, and so on in a spiral manner around the tape.

Most current technology manages tape media as a single stream of serial storage having a single beginning of data (BOD) location and single end of data (EOD) location. Each subsequent write operation defines a new single EOD moving down the length of the tape as more data is stored to the tape cartridge. A header block including data format information is recorded at the beginning of a data portion to be written and specifies the configuration of the data to follow. The head assembly then records user data onto a variable sized portion of tape whose length depends upon the amount of user data recorded. An EOD marker is recorded once all the user data has been recorded. When tape files are updated or modified, the original file is left on tape and the new modified file is added to the end of the serial stream. To access user data stored in the middle of the tape, the head assembly must read all the header blocks until the desire user data is reached. Periodically, the tape may be scratched to erase or otherwise remove old or expired data.

More recently, magnetic tape has been broken up into a number of partitions to facilitate management of and access to stored data. "Partitioning" generally involves the establishment of at least one independently addressable data storage region on the tape (e.g., during pre-formatting of the magnetic tape and/or during a data write). For instance, a two-partition system generally involves dividing tape along its length into a user data partition and a file directory (e.g., index) partition which stores metadata necessary to locate specific data in the user data partition free of external information so as to make the tape appear as disk to external applications. The index includes a hierarchical directory structure and files with attributes such as file name, date, and size, and the index can be accessible in a manner that is independent of the data files stored on the tape. The index in the file directory partition is sequentially updateable (i.e., metadata for newly written data blocks is appended at the end of the most recently written metadata in the file directory).

In some arrangements, each track or wrap of the magnetic tape may include a plurality of partitions, where each data write consumes one or more partitions. In one variation, partitions may be of fixed size so that a single recording of data may span or otherwise encompass multiple fixed partitions. Through use of partitioning, a number of logical tape libraries can be created from a single length of magnetic tape. Each partition may have a number of portions such as a header (e.g., including any appropriate address or identifier, unique key, and/or the like), a data storage portion, and the like. Additionally, partitions may be defined by filemarks or setmarks (i.e., special recorded elements that do not contain user data; they simply divide the partition into smaller areas to provide an address scheme). The head assembly may utilize the tape file system along with the header information to locate a particular partition to dynamically or randomly read or write data.

Often, magnetic tape is pre-formatted with a plurality of guards (i.e., strips of the tape on which user data cannot be written) running either perpendicular to the tape length (to separate the tape into a number of sections or segments) or along the tape length (to separate the tape into a number of servo portions or data bands on which independent read/write heads can operate). A head assembly will often have a plurality of read/write heads that are operable to simultaneously read and/or write in one or more tracks in respective data bands. One or more tracks written at the same time along the tape length is referred to as a "wrap." In this regard, a new wrap begins each time the head assembly begins reading or writing in the forward or reverse directions.

Partitioning of magnetic tape can sometimes have the drawback of reduced storage capacity of the magnetic tape. In this regard, "shingling" of magnetic tape media has been introduced as a way to increase the data density of magnetic tape in a manner that is generally free of significant changes to the structure of the underlying magnetic tape media and/or the head assemblies. Generally, shingling refers to the situation where one wrap at least partially overlaps and overwrites an adjacent previous wrap. The portion of each wrap not overlapped by an adjacent, subsequent wrap may be referred to as an "actual" or "residual" wrap which can be read by the read head of the head assembly. Shingling allows for the tighter placement and reduction in width of residual data tracks without requiring a reduction in size of the write head of the head assembly (which would likely require increased costs, effort, and the like). While shingled wraps can be randomly or dynamically read, they are generally not dynamically written because doing so would inherently erase or write over a portion of an adjacent residual wrap. In this regard, new and/or updated data is written sequentially to the end of the most recently written data on the magnetic tape. Furthermore, file directories for shingled magnetic tape are typically stored on a remote storage medium (e.g., magnetic disk). While some arrangements include file directories stored directly on a length of magnetic tape, such file directories are only sequentially writable as a stream and thus are not dynamically writable or updateable.

SUMMARY

The inventor has determined that it would be advantageous to have a dynamically writable and readable file directory located directly on a pack of shingled magnetic tape to increase the speed at which user data on the magnetic tape may be identified and located as well as the speed at which updates to the file directory can be implemented. More specifically, it has been determined that it would be desirable to obtain both the increased data density provided by shingling in addition to the ability to perform dynamic or in-place writing of file metadata provided by fixed, non-shingled partitions.

In this regard, disclosed herein is a partitioning format for magnetic tape (as well as magnetic tape so formatted, tape drives configured to write to and read from such tape, and the like) that includes at least a first portion (e.g., a file directory) having a plurality of dynamically updateable (e.g., non-shingled) partitions and a second portion (e.g., a data portion) having a plurality of shingled partitions that may be sequentially and/or linearly written and dynamically readable. For instance, imagine that a length of magnetic tape includes a plurality of physical wraps (e.g., areas on the magnetic tape surface over which data is written) numbered 0 through N starting at the top of the tape, where each wrap extends along the length of the tape, and where the physical wraps are divided into a number of "bands" (e.g., 8 bands), again numbered from 0 through N starting at the top of the tape. Furthermore, each wrap may be divided into a plurality of partitions, such as in a direction that is substantially perpendicular to the length of the magnetic tape.

In one arrangement, the partitions of at least one wrap of at least one of the data bands (e.g., the first wrap at the bottom or top of the data band) may be free of overlapping by adjacent wraps and partitions while the remaining wraps of the data band as well as those of the other data bands may be shingled. In this regard, the partitions of the shingled wraps may be used to store sequentially written data as a stream while the partitions of the non-shingled wrap(s) may be used to store metadata (e.g., file directory information) about the written data. Advantageously, the application or other program that facilitates reading and/or writing of data from or to the tape can read the metadata in the non-shingled partitions (e.g., the file directory) when the tape is mounted in the tape drive and can rewrite the metadata into the non-shingled partitions at anytime without disturbing (e.g., erasing, modifying, and the like) the data in the shingled wraps.

To illustrate, a first data block may be sequentially written (e.g., via a head assembly) in one or more partitions of the shingled wraps of one or more data bands, and any appropriate metadata (e.g., address, size, and the like) corresponding to the first data block may be stored in one of the partitions of the file directory. At some time after a second data block has been written to the shingled wraps of one or more of the data bands, imagine that a user desires to write a third data block that is somehow related to the first data block. For instance, the first data block may represent a batch of employee data for an organization, where data such as name, social security number, phone number, and the like exists for each employee. The third data block may represent an additional category of data for each employee (e.g., such as department). As discussed previously, the first data block generally is generally unable to be dynamically updated so as to include the third block of data due to the shingled nature of the partitions making up the user data portion of the magnetic tape.

However, and in contrast to previous systems and formats where file metadata for newly written data is either appended to the end of the most recently written metadata in a file directory on the magnetic tape or on an external disk drive, the new format disclosed herein allows metadata for newly written data blocks to be dynamically written in any appropriate location in the file directory on the magnetic tape (i.e., as opposed to necessarily being written and the end of the file directory or on an external disk drive). For instance, instead of writing the metadata for the third data block at the end of the file directory and spaced from the first data block metadata by metadata of the second data block, the third data block metadata may be written directly adjacent or otherwise linked to the first data block metadata to facilitate retrieval of both the first and third blocks. As another example, it is envisioned that metadata for a particular data block may be written in the file directory at a location that is at the same linear position along the tape as the particular data block. For instance, if the BOD of a particular data block is at a location that is 100 meters down the tape, some or all of the metadata for the particular data block may be at a location is the file directory that is also 100 meters down the tape. This arrangement advantageously reduces the need for the head assembly from having to first locate the metadata for a particular data block in the file directory, and then locate the BOD for the particular data block in the data portion which could be hundreds of meters away from the metadata (and which could take many tens of seconds to access).

In one aspect, a magnetic tape includes a plurality of shingled wraps disposed between upper and lower edges of the magnetic tape and extending along the length of the magnetic tape, at least a first non-shingled wrap extending along the length of the magnetic tape, and a plurality of data bands disposed between the upper and lower edges of the magnetic tape. Each of the wraps is divided into a plurality of partitions, each band includes a subset of the plurality of shingled wraps, and at least a first of the data bands includes the first non-shingled wrap. The plurality of shingled wraps are adapted to include sequentially written data (e.g., as a stream of data), and the first non-shingled wrap is adapted to include dynamically written data free of modifying data of the plurality of shingled wraps.

In one arrangement, a method includes writing data to at least one partition of the non-shingled wrap of the disclosed magnetic tape free of (e.g., without) modifying data in the shingled wraps. For instance, the method may include inserting a tape cartridge including the magnetic tape into a tape drive and then using the tape drive to perform the writing step.

In another arrangement, a tape drive includes a head assembly that is adapted to write data to and read data from the disclosed magnetic tape and a controller in communication with the head assembly. The controller is adapted to cause the head assembly to both linearly write data to at least one partition of at least one of the shingled wraps of the magnetic tape and dynamically write data to at least one partition of the at least one non-shingled wrap of the magnetic tape. For instance, the dynamically written data may be file directory metadata for the linearly written data.

In another aspect, a method for use with a pack of magnetic tape is disclosed, where the magnetic tape pack includes a plurality of data bands arranged between upper and lower edges of the magnetic tape pack, and where each data band extends along the length of magnetic tape pack and includes a plurality of physical wraps extending along the length of the magnetic tape pack. The method includes first linearly writing data along partitions of one physical wrap of a first of the data bands in a forward direction of the magnetic tape pack; second linearly writing data along partitions of another physical wrap of a second of the data bands in a reverse direction of the magnetic tape pack that is opposite from the forward direction; continuing to alternatively perform the first and second linearly writing steps, where each successive physical wrap written in the first writing step is closer to the lower edge than is the immediately preceding written physical wrap, and where each successive physical wrap written in the second writing step is closer to the upper edge than is the immediately preceding written physical wrap; and dynamically writing data along at least one partition of a physical wrap of at least one of the first and second data bands, where the dynamically written data includes file directory metadata corresponding to data written during the first and second linearly writing steps.

In a further aspect, a method for writing data to magnetic tape includes linearly writing user data into at least one partition of at least one shingled wrap of one of a plurality of data bands of the magnetic tape, and dynamically writing file directory metadata for the user data into at least one partition of at least one non-shingled wrap of one of a plurality of data bands of the magnetic tape, where the dynamically writing step occurs free of modifying the user data.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Disclosed herein is a partitioning format (as well as magnetic tape so formatted, tape drives configured to write to and read from such tape, and the like) for applications that utilize linear or sequential recording of data. The disclosed format provides for both increased storage capacity of magnetic tape (via the use of shingled wraps and/or partitions) as well as a local, on-tape file directory (within one or more non-shingled wraps and/or partitions) adapted to store file metadata for data stored in the shingled partitions that may be dynamically updateable in a manner free of disturbing (e.g., erasing, editing, and the like) the shingled partition data. That is, as opposed to previous local file directories on shingled magnetic tape whereby file metadata is necessarily linearly appended to the end of the most recently written metadata in the file directory, the presently disclosed partitioning format allows, for instance, the file metadata of a particular file (the file being stored in the shingled partitions) to be randomly updated, even if the file metadata is disposed in a partition between the file metadata for two other files (and in a manner free of disturbing the file metadata for the two other files as well as any files stored in the shingled partitions). In one arrangement, the non-shingled partitions of the file directory may be the first several or more partitions of the magnetic tape (e.g., part of what would otherwise be the first logical wrap of the tape made by a head assembly).

Figure 1:
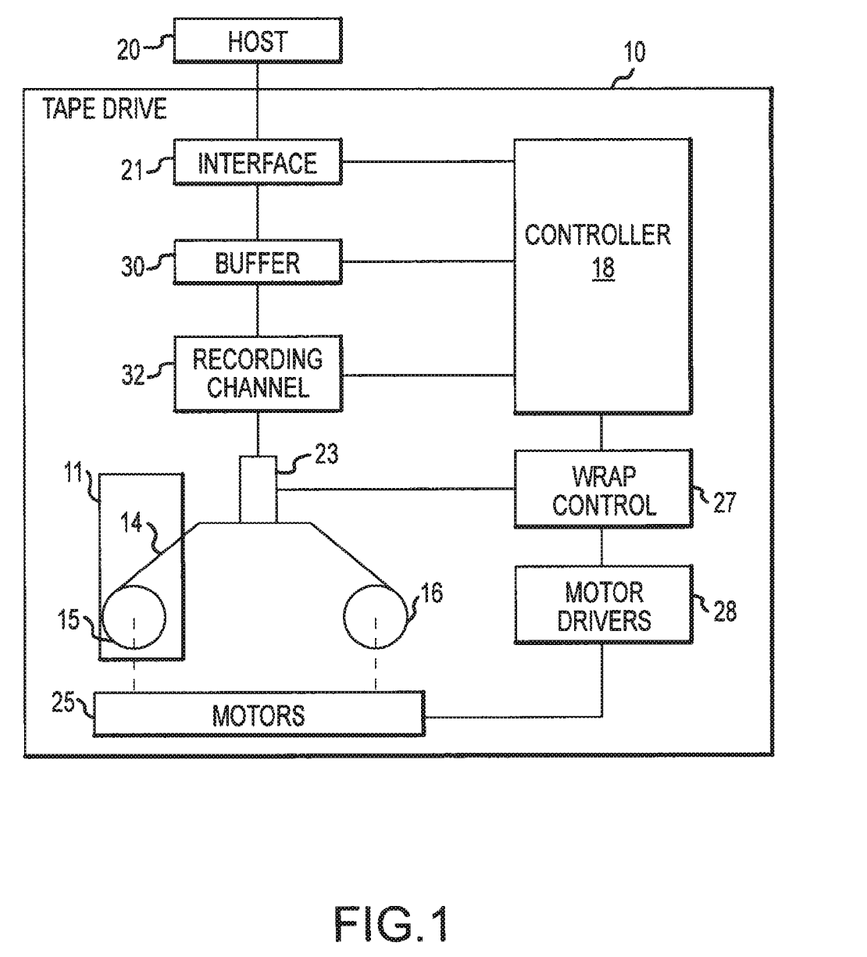
FIG. 1 is a schematic view of an exemplary tape drive including a magnetic tape cartridge that may be adapted to implement the various functionalities and formats disclosed herein.

With reference to FIG. 1, a schematic view of an exemplary tape drive 10 including a magnetic tape cartridge 11 that may be adapted to implement the partitioning format disclosed herein is illustrated, although it should be understood that numerous other forms of tape drives and cartridges may be used to implement the disclosed partitioning format. For instance, single reel tape drives, dual reel cartridges, and the like are all envisioned as being able to implement the disclosed formats, methods, and the like.

The magnetic tape cartridge 11 includes a length of magnetic tape 14 (e.g., magnetic tape pack, magnetic tape media) wound on a number of reels 15, 16. The tape drive 10 may include one or more controllers 18 of a recording system for operating the tape drive 10 in accordance with commands received from a host system 20 received at an interface 21. The tape drive 10 may be coupled to the host system 20 in a number of manners such as directly, through a library, or over a network (e.g., via Small Computer Systems Interface (SCSI), Fibre Channel Interface, and the like). The tape drive 10 may be a standalone unit or form part of a tape library or other subsystem.

In any event, the magnetic tape cartridge 11 may be inserted into the tape drive 10 and loaded by the tape drive 10 so that one or more read and/or write heads (e.g., a head assembly) 23 of the recording system reads and/or writes information with respect to the magnetic tape 14 as the tape is moved longitudinally in first/forward and/or second/reverse opposed directions by one or more motors 25. The magnetic tape pack 14 may include a plurality of parallel physical wraps (not shown in FIG. 1), each physical wrap including a plurality of tracks that may be written to or read by the head assembly 23. In some formats (e.g., Linear Tape Open or LTO), the tracks of the physical wraps may be written and/or read in a serpentine, back and forth manner; in a spiral-in manner; and the like. The recording system may include a wrap control system 27 to electronically switch to another set of heads of the head assembly 23 and/or to seek and move the read/write heads 23 laterally relative to the magnetic tape; to position the heads 23 at a desired wrap or wraps; to follow a desired wrap or wraps; and/or the like.

In some arrangements, the magnetic tape pack 14 may also include a plurality of logical wraps, where each logical wrap represents the order in which a particular physical wrap was written and/or read. For instance, one of the physical wraps in the middle of the magnetic tape may in some formats actually be the first wrap that is written on the magnetic tape pack 14 and thus the first logical wrap of the magnetic tape pack 14. The wrap control system 27 may also control the operation of the motors 25 through motor drivers 28 in response to instructions by the one or more controllers 18 (e.g., which provide the data flow and formatting of data to be read from and written to the magnetic tape pack 14 via employing a buffer 30 and a recording channel 32).

Figure 2:
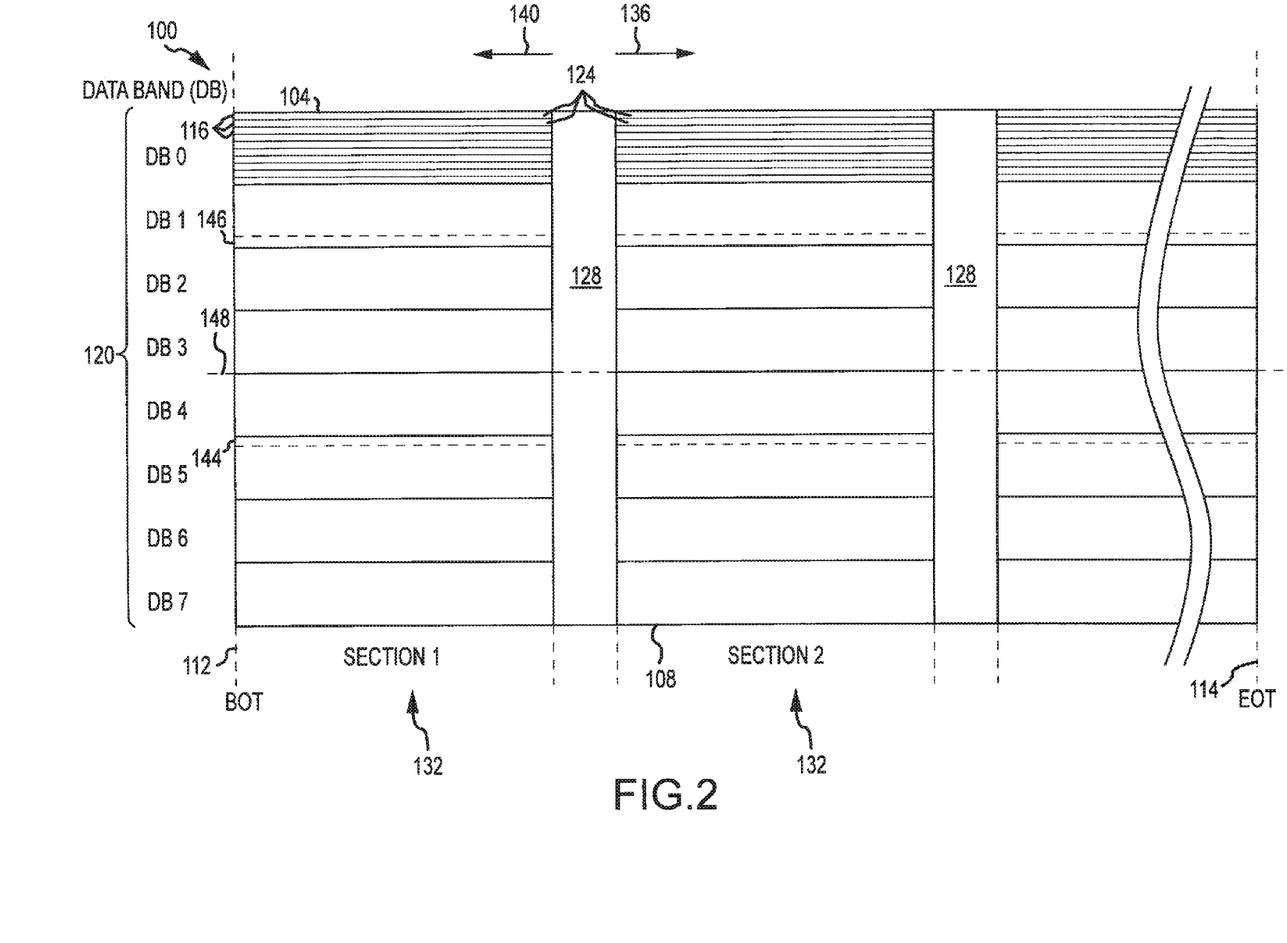
FIG. 2 is a schematic diagram showing a portion of a magnetic tape pack that includes the partitioning format disclosed herein, according to one embodiment.

Turning now to FIG. 2, a schematic diagram showing a portion of a magnetic tape pack 100 (e.g., magnetic tape pack 14) that implements the partitioning format disclosed herein, according to one embodiment, is shown (e.g., and that may be used with the tape drive 10 and cartridge 11 of FIG. 1). Broadly, the magnetic tape pack 100 includes an upper edge 104, a lower edge 108, a beginning of tape (BOT) 112, an end of tape (EOT), 114, and a plurality of physical wraps 116 disposed or arranged between the upper and lower edges 104, 108 (and each of which generally extends along the length of the magnetic tape pack 100 from or adjacent the BOT 112 to or towards the EOT 114). As will be discussed in more detail below, the physical wraps 116 are shingled so that each physical wrap 116 overlaps an adjacent physical wrap 116 so as to increase the data capacity of the magnetic tape pack 100. As the physical wraps 116 are shingled, new or updated data is appended or added to a particular physical wrap at the end of the most recently added data rather than being dynamically or randomly written as attempts to do so would result in the erasure or modification of data in adjacent (e.g., previous or subsequent) physical wraps 116.

Each physical wrap 116 may generally be made up of a plurality of tracks (not shown), where the head assembly 23 is adapted to write data to and/or read data from the plurality of tracks simultaneously and/or in other appropriate manners. To facilitate access to and/or management of data, each physical wrap 116 may be appropriately divided (e.g., in a direction extending between the upper and lower edges 104, 108 and generally perpendicular to the length of the magnetic tape pack 100 or, in other words, along a width of the magnetic tape pack 100) into a plurality of individually addressable partitions 124. For instance, the magnetic tape pack 100 may include a plurality of guard bands 128 (e.g., buffers or areas that are generally free of data) each of which extends in a direction between the upper and lower edges 104, 108 (e.g., substantially perpendicularly to the length of the magnetic tape pack 100) to divided each physical wrap 116 into the plurality of partitions 124. In this regard, a particular block of data (e.g., a file) may consume one or more partitions 124 of one or more physical wraps 116. For instance, each partition 124 may have a number of portions such as a header (e.g., including any appropriate address or identifier, unique key, and/or the like), a data storage portion, and the like. The head assembly 23 may utilize file metadata in a file directory (discussed below) along with the header information to locate a particular partition to read and/or write data or a data block.

In addition to the partitions 124, the magnetic tape pack 100 may also be appropriately divided into a plurality of data bands (DBs) 120 disposed or otherwise arranged between the upper and lower edges 104, 108, each of which includes a plurality of the physical wraps and each of which generally extends along the length of the magnetic tape pack 100. Stated differently, each DB 120 includes a subset of the plurality of physical wraps 116 (only shown for DB0 in the interest of clarity). While FIG. 2 illustrates the use of eight DBs 120 (DB0-DB7), it is envisioned that more or fewer than eight DBs 120 may be utilized without departing from the teachings of the present disclosure. The portion of the magnetic tape pack 100 between the BOT 112 and the first guard band 128; between the first guard band 128 and the second guard band 128; and so on; may each be referred to as a segment or section 132 (e.g., segment 1, segment 2, and the like). When the magnetic tape pack 100 is installed in a tape drive (e.g., tape drive 10 of FIG. 1), data is adapted to be linearly/sequentially written to the partitions 124 of the physical wraps 116 by a head assembly (e.g., head assembly 23) in first/forward and opposed second/reverse directions 136, 140 in numerous manners. With respect to FIG. 1 and as may be appreciated, writing/reading data in the forward direction 136 may require the magnetic tape pack 100 to be moved in the second/reverse direction 140 past the head assembly 23, and vice versa. Furthermore, it is to be understood that the various components and features of the magnetic tape pack 100 that are described herein are not necessarily drawn to scale.

In one arrangement, some of the DBs 120 (e.g., DBs 4-7 in FIG. 2) may be written in the forward direction 136 while others (e.g., DBs 0-3) may be written in the reverse direction 140. Furthermore, the physical wraps 116 of each DB 120 may be written in relation to other physical wraps 116 of the DB 120 in any appropriate manner. In another arrangement, the physical wraps 116 of each DB 120 may be written in an "inside-out" manner by way of successively filling up adjacent physical wraps 116 of a DB 120 in a direction towards one of the upper and lower edges 104, 108 of the magnetic tape pack 100. Combinations of the above arrangements are also possible.

As an example, and with reference to FIG. 2, DBs below centerline 148 (e.g., DBs 4-7 in FIG. 2) or other reference line or point (which may be other than the centerline 148 of the magnetic tape pack 100) may be linearly written in the forward direction 136 starting with physical wraps 116 closest to the centerline 148 and progressively moving towards physical wraps closest to the lower edge 108. Correspondingly, DBs above centerline 148 (e.g., DBs 0-3) or other reference line or point may be linearly written in the reverse direction 140 starting with physical wraps 116 closest to the centerline 148 and progressively moving towards physical wraps closest to the upper edge 108. In one arrangement, the head assembly 23 may cycle between writing to wraps of a first pair of DBs 120 until the first pair is full, and then to wraps of a second pair of DBs 120, and so on.

Figure 3:
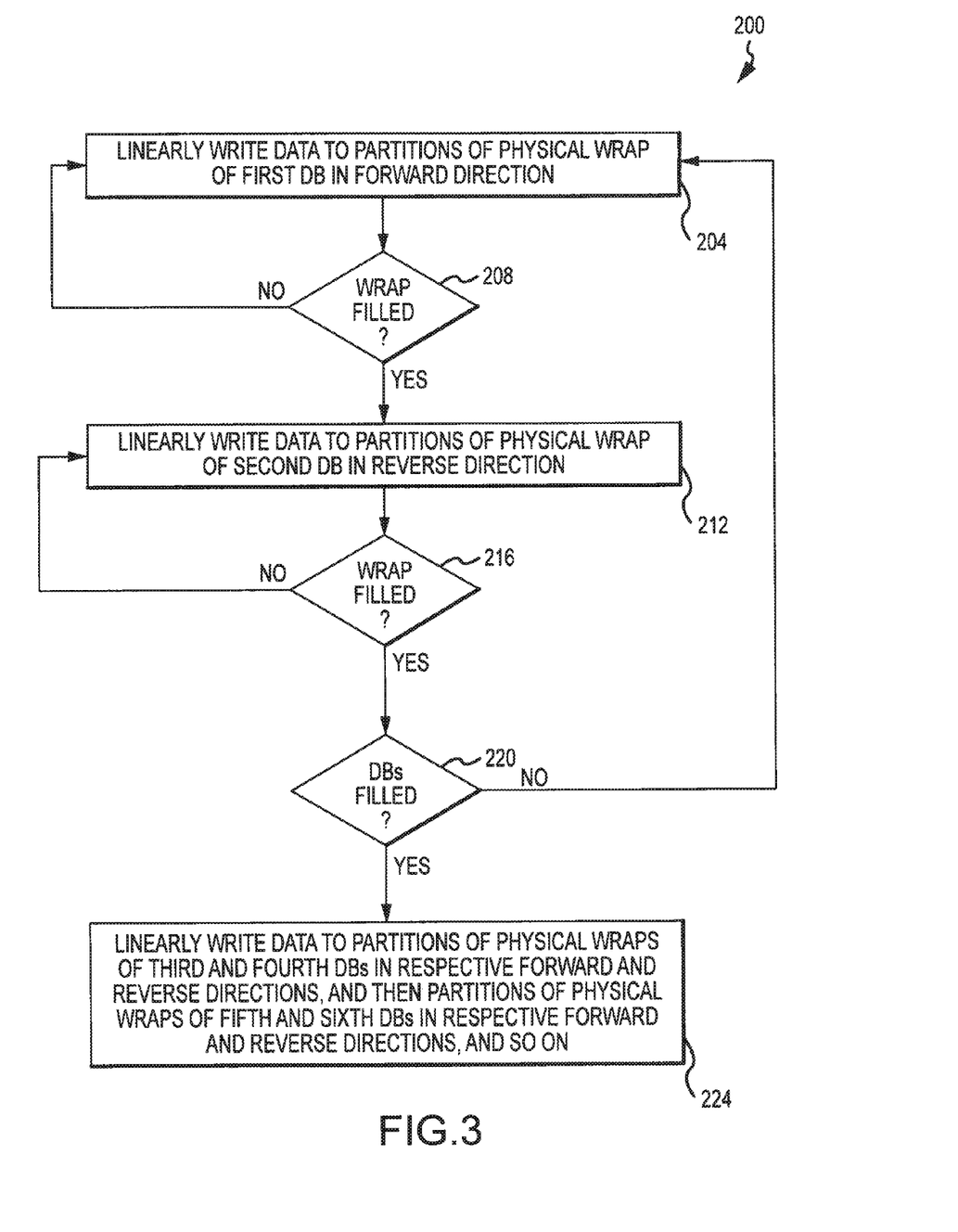
FIG. 3 is a flow chart illustrating a method of writing user data to the magnetic tape pack of FIG. 2.

For instance, and with reference to the method 200 of FIG. 3, the head assembly 23 may write 204 a block of data (e.g., linearly as a stream) into one or more partitions of a physical wrap 116 of a first DB 120 in the forward direction 136 (e.g., DB5, starting with the first physical wrap 116 with available space closest to centerline 148). The method 200 may then query 208 whether the wrap has been filled (e.g., either during the same write operation or during a subsequent write operation). If the wrap has not been filled, the method 200 may continue to write 204 data into the partitions of the physical wrap 116 of the first DB 120 in the forward direction. Otherwise, the method 200 may proceed to write 212 the data block into partitions of a physical wrap 116 of a second DB 120 in the reverse direction 140 (e.g., DB1, starting with the first physical wrap 116 with available space closest to centerline 148, again, linearly as a stream). Again, the method 200 may query 216 whether the wrap has been filled, and may proceed to continue to write 212 the data block into partitions of the physical wrap 116 of the second DB 120 in the reverse direction 140.

If the physical wrap 116 of the second DB has been filled, the method 200 may then query 220 whether all the wraps of the first and second DBs have been filled. In the event that empty physical wraps 116 remain in the first DB 120, the method 200 may cycle back to 204 to continue to linearly write the data block as a stream into partitions of an adjacent physical wrap 116 of the first DB 120 in the forward direction (e.g., where the adjacent physical wrap 116 of the first DB 120 is closer to the lower edge 108 than is the first physical wrap 116 of the first DB 120). In this regard, the head assembly 23 may essentially move in an inside-out spiral relative to the first and second DBs 120 until the first and second DBs 120 have been filled. In response to a positive answer to the query 220, the method 200 may then proceed to write 224 data to partitions of physical wraps of third and fourth DBs 120 (e.g., DB6 and DB2) in respective forward and reverse directions in an inside-out spiral manner, and then to partitions of physical wraps of fifth and sixth DBs 120 (e.g., DB7 and DB 3) in respective forward and reverse directions in an inside-out spiral manner, and then to partitions of physical wraps of seventh and eighth DBs (e.g., DB4 and DB0) in respective forward and reverse directions in an inside-out spiral manner, and/or so on.

While an inside-out spiral manner of writing data to successive pairs of DBs 120 has been described, other manners of writing are also envisioned and are encompassed within the scope of the present disclosure. In some embodiments, the head assembly 23 may write data in a "spiral-in" manner, such as by writing to physical wraps 116 of DB7 and DB0 in respective forward and reverse directions starting with physical wraps 116 furthest away from the centerline 148 and progressively moving towards physical wraps 116 closer to the centerline 148 until the DB7 and DB0 are full, moving to DB6 and DB1, and so on. In other embodiments, "serpentine" manners of writing data to the DBs 120 may be used. Of course, reading data may also entail moving in the same or similar manner in which the data was written (e.g., inside-out spiral, spiral-in, serpentine, or the like).

As discussed previously, the host 20 or other application managing the reading and writing of data from and to the shingled wraps of a magnetic tape pack needs access to any appropriate file directory that includes various types of metadata (e.g., names, addresses, size, and the like) describing files and data stored on the magnetic tape pack. In some previous arrangements, file directories for magnetic tape packs are stored on external disk drives that are accessed to interact with the tape drive 10 to allow for reading data from or writing data to a particular magnetic tape pack. In other previous arrangements, file directories may be stored "on-board" a magnetic tape pack to make the tape pack appear as disk to external applications. As discussed above, for instance, previous "two-partition" systems involve dividing tape along its length into a user data partition and a file directory (e.g., index) partition which stores information necessary to locate specific data in the user data partition. However, as data is written to the file directory partitions (as well as the user data partitions) linearly or sequentially, updating or adding to the file directory partition necessarily requires appending data at the end of the most recently written metadata in the file directory which can increase the time required to implement changes to the file directory, result in the inefficient use of space in the file directory, and the like. While some previous magnetic tape packs include on-board file directories made up of dynamically updateable partitions, such tape packs also store the user data in dynamically updateable (e.g., non-shingled) partitions which results in a reduced storage capacity as compared to systems that store user data in shingled partitions.

In this regard, and with continued reference to FIG. 2, at least one of the DBs 120 may include at least one non-shingled physical wrap 144 generally extending between the BOT 112 and the EOT 114 and divided into partitions 124 that may function as a file directory for data and other information stored in the shingled physical wraps 116 of one or more of the DBs 120. As the at least one physical wrap 144 is non-shingled, data (e.g., file directory metadata) can be dynamically written to and read from its partitions 124 which can allow for the more efficient use of space in the file directory (e.g., by allowing original metadata to be modified in its original location rather than requiring modifications to necessarily be appended to the end of the file directory). Furthermore, as the at least one non-shingled physical wrap 144 is spaced from the shingled physical wraps 116 as will be discussed in more detail below, updates can be made to metadata in the at least one non-shingled physical wrap 144 in a manner free of disturbing (e.g., modifying, editing, destroying) data in the shingled physical wraps 116.

To increase the speed at which the head assembly 23 can access the file directory, the at least one non-shingled physical wrap 144 may form what would otherwise be the first logical wrap of the magnetic tape pack (i.e., the first wrap that the head assembly 23 moves relative to after the magnetic tape pack 100 is loaded into the tape drive 10). In the example discussed above in relation to FIGS. 2-3, the at least one non-shingled physical wrap 144 may be disposed within DB5 and adjacent the upper edge of DB5 as the head assembly 23 first moves over DB5 in the forward direction starting with wraps closest to the centerline 148. In this regard, the head assembly 23 can move over the partitions 124 of the at least one non-shingled physical wrap 144, read metadata from and/or write metadata to such partitions, and appropriately read data from and/or write data to one or more partitions 124 of the shingled physical wraps 116 of one or more of the DBs 120 (e.g., one or more of DB0-DB7).

In one arrangement, the magnetic tape pack 100 may include a second non-shingled physical wrap 146 generally extending between the BUT 112 and the FOT 114 and divided into partitions 124 that may also function as a file directory into which file metadata for data stored in the shingled physical partitions may be dynamically written and read. For instance, the second non-shingled physical wrap 146 may form what would otherwise be the second logical wrap of the magnetic tape pack 100 (e.g., in the example of FIGS. 2-3, the wrap in DB1 closest to the centerline 148). In one arrangement, the head assembly 23 may first move in the forward direction 136 relative to the first non-shingled physical wrap 144, and then move in the reverse direction 140 relative to the second non-shingled physical wrap 146, and then proceed to read or write data (e.g., according to the method 200 of FIG. 3). Of course, the first and/or second non-shingled physical wraps (and/or other such non-shingled physical wraps) may be located other than as shown in FIG. 2, so long as such non-shingled physical wraps are located at or near the first logical wrap(s) of the magnetic tape 100. For instance, in the case where data is written or read in a spiral-in manner, at least one non-shingled physical wrap may be located in DB5 (or other DB 120) at a position that is farthest away from the centerline 148 (e.g., such as closest to the lower edge 108 in FIG. 2). Other locations for one or more non-shingled physical wraps are also envisioned.

Figure 4:
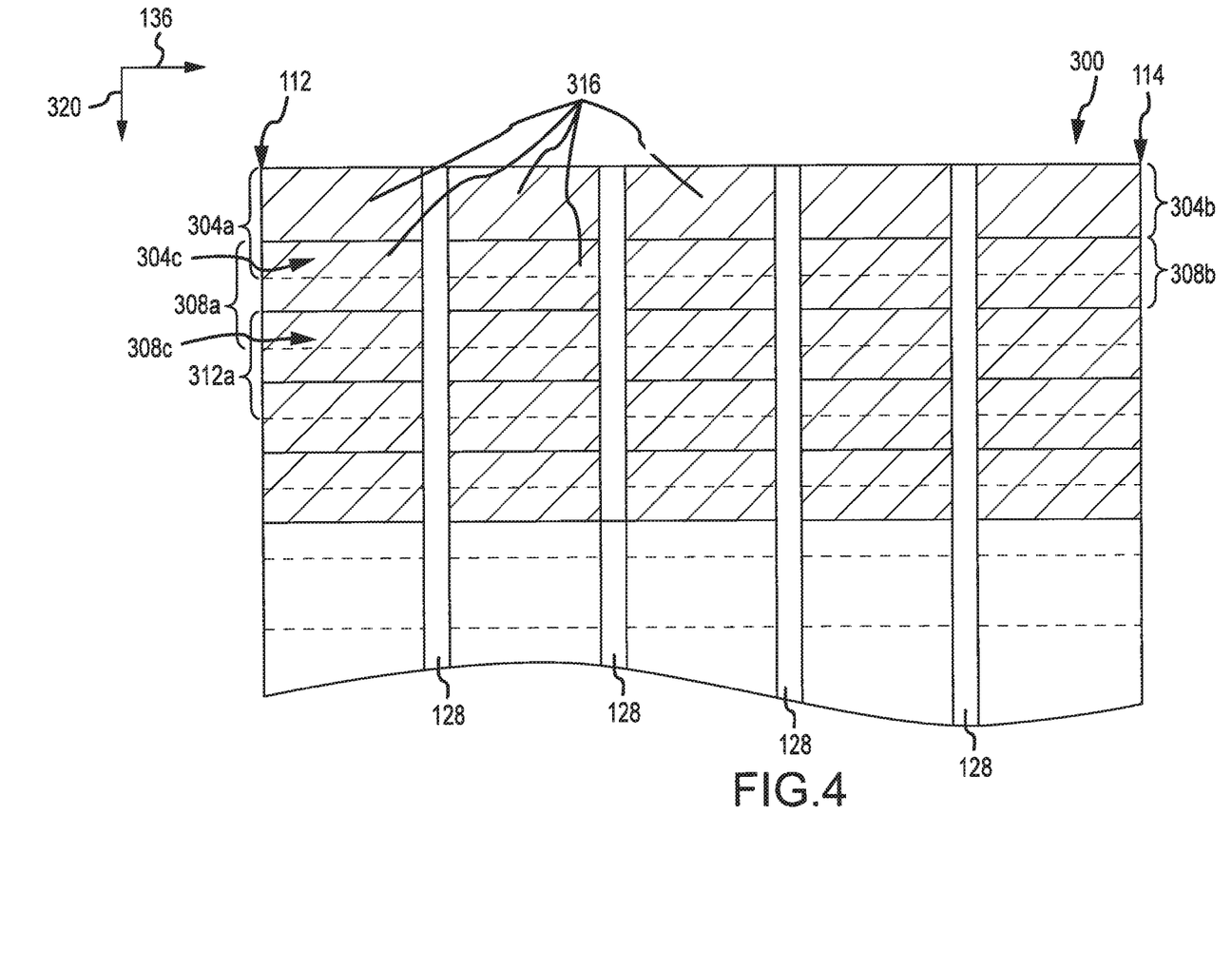
FIG. 4 is close-up view of a portion of a data band of the schematic diagram of FIG. 2.
Figure 5:
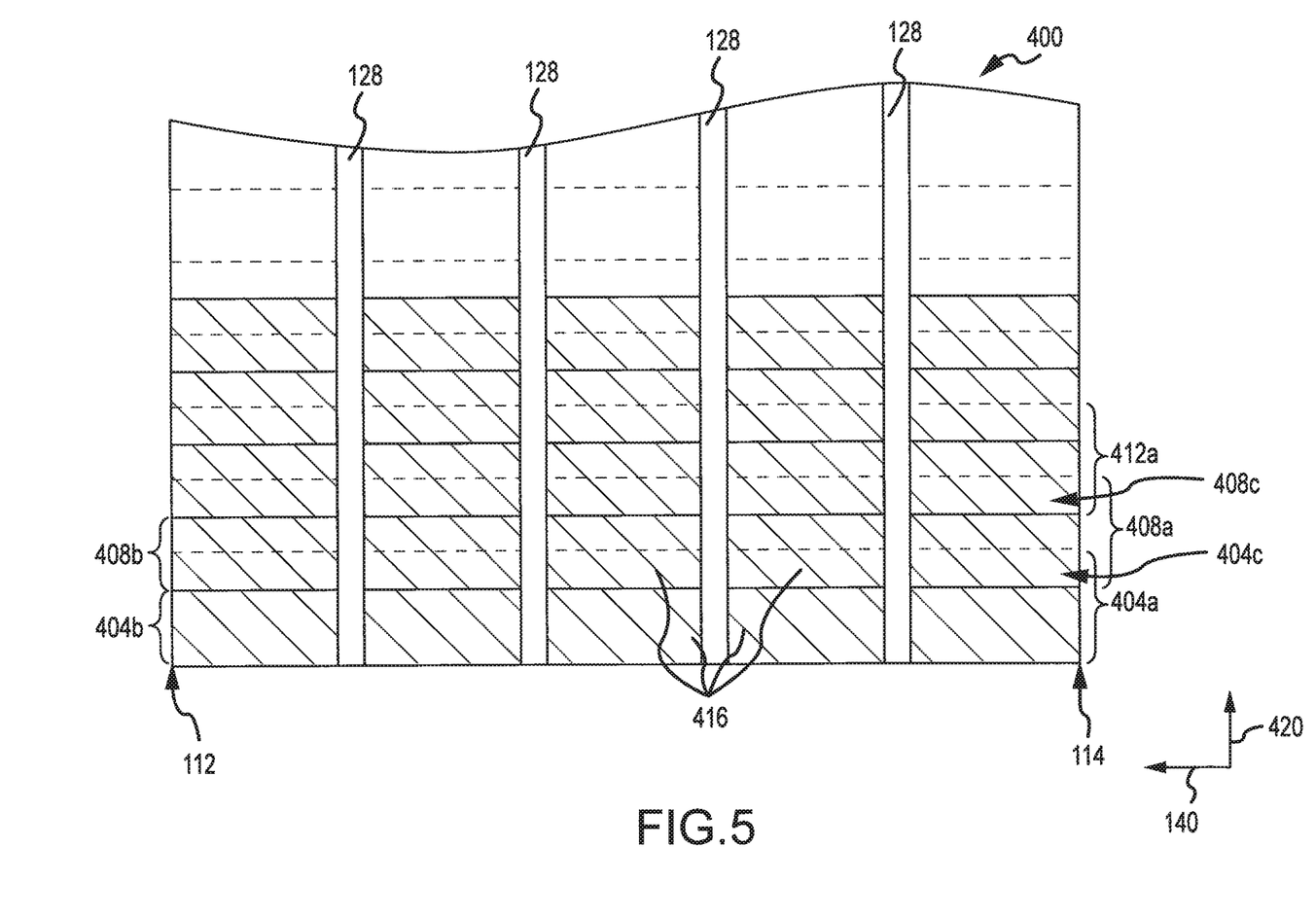
FIG. 5 is close-up view of a portion of another data band of the schematic diagram of FIG. 2.

Before discussing the first and second non-shingled physical wraps 144, 146 in more detail, reference will be made to the schematic views of FIGS. 4-5 which illustrate in detail the manner in which the physical wraps 116 of the DBs 120 are shingled in relation to one another. FIG. 4 illustrates the shingling of physical wraps 116 of a DB 300 (e.g., DBs 4, 6 or 7 in FIG. 2 that may be free of non-shingled physical wraps) that are written in the forward direction 136 and in a direction 320 away from the centerline (not shown in FIG. 4) of the magnetic tape pack 100. FIG. 5 illustrates the shingling of physical wraps 116 of a DB 400 (e.g., DBs 3, 2 or 0 in FIG. 2 that may be free of non-shingled physical wraps) that are written in the reverse direction 140 and in a direction 420 away from the centerline (not shown in FIG. 5) of the magnetic tape pack 100. Again, it is to be understood that the various components and features of FIGS. 4-5 (as well as of FIGS. 6-7, discussed below) described herein are not necessarily drawn to scale.

With initial reference to FIG. 4, a number of initial physical wraps 304a, 308a, 312a and the like may be written (e.g., by head assembly 23) over the surface of the magnetic tape pack 100 starting at the BOT 112 and extending in the forward direction 136 to or towards the EOT 114 within a plurality of partitions 316. With particular reference to initial physical wraps 304a and 308a, it can be seen how initial physical wrap 308a partially overlaps and writes over or erases an overlapped portion 304c of initial physical wrap 304a resulting in a residual physical wrap 304b that represents actual data that may be subsequently read by head assembly 23. Similarly, initial physical wrap 312a partially overlaps and writes over or erases an overlapped portion 308c of initial physical wrap 308a resulting in a residual physical wrap 308b that represents actual data that may be subsequently read by head assembly 23. Successive initial physical wraps may similarly overlap previous adjacent initial physical wraps as discussed above resulting in subsequent residual physical wraps of readable data.

This overlapping or shingling manner of writing data along the magnetic tape pack 100 sometimes relies on the fact that the head assembly 23 may not be able to write actual data over the entire width of the head assembly 23. For instance, the head assembly 23 may only be able to write data under the left x % of the width of the assembly 3, with the right y % necessarily modifying or erasing data thereunder. Thus, in the absence of shingling, storage capacity would be lost due to the portions of the magnetic tape pack 100 erased or at least modified by each pass of the head assembly 23. Shingling as disclosed herein allows for the more efficient use of space on the magnetic tape pack 100 (e.g., note how residual physical wrap 308b is written over overlap portion 304c, a portion that may otherwise contain unreadable or unusable data anyway). However, shingled wraps are generally not dynamically written as doing so would inherently destroy or write over data in adjacent wraps (e.g., note how attempting to dynamically write over a partition 316 of initial physical wrap 304a would inherently write over or erase a portion of residual physical wrap 308b).

Turning now to FIG. 5, a number of initial physical wraps 404a, 408a, 412a and the like may be written (e.g., by head assembly 23) over the surface of the magnetic tape pack 100 starting at the EOT 114 and extending in the reverse direction 140 to or towards the BOT 112 within a plurality of partitions 416. As with the DB 300 of FIG. 4, each of initial physical wraps 408a, 412a, and the like respectively overlap immediately preceding initial physical wraps over respective overlap portions 404c, 408c, and the like resulting in respective residual physical wraps 404b, 408b, and the like which represent or contain actual data that may be subsequently read by head assembly 23. With brief reference back to the method 200 of FIG. 3, steps 204 and 212 may entail writing data to partitions 316 of initial physical wrap 304a of DB 300 in the forward direction 136, writing data to partitions 416 of initial physical wrap 404a of DB 400 in the reverse direction 140, writing data to partitions 316 of initial physical wrap 308a of DB 300 in the forward direction 136 so as to overlap initial physical wrap 304a leaving residual physical wrap 304b, writing data to partitions 416 of initial physical wrap 408a of DB 400 in the reverse direction 140 so as to overlap initial physical wrap 404a leaving residual physical wrap 404b, and so on and so forth until a determination has been made at 220 that DBs 300 and 400 are both filled at which point another pair of DBs (similar or same as DBs 300, 400) may be written to.

Figure 6:
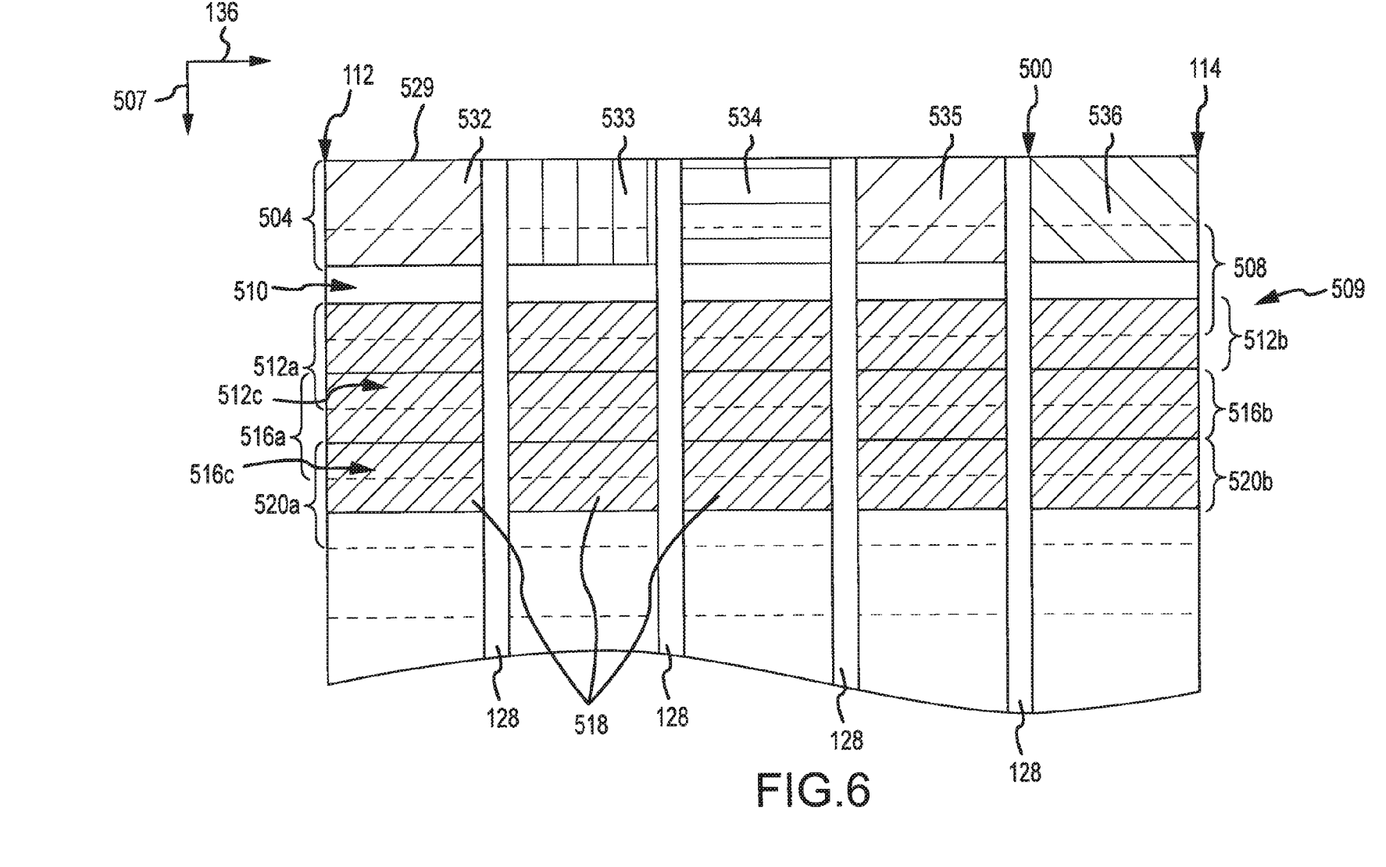
FIG. 6 is close-up view of a portion of another data band of the schematic diagram of FIG. 2.
Figure 7:
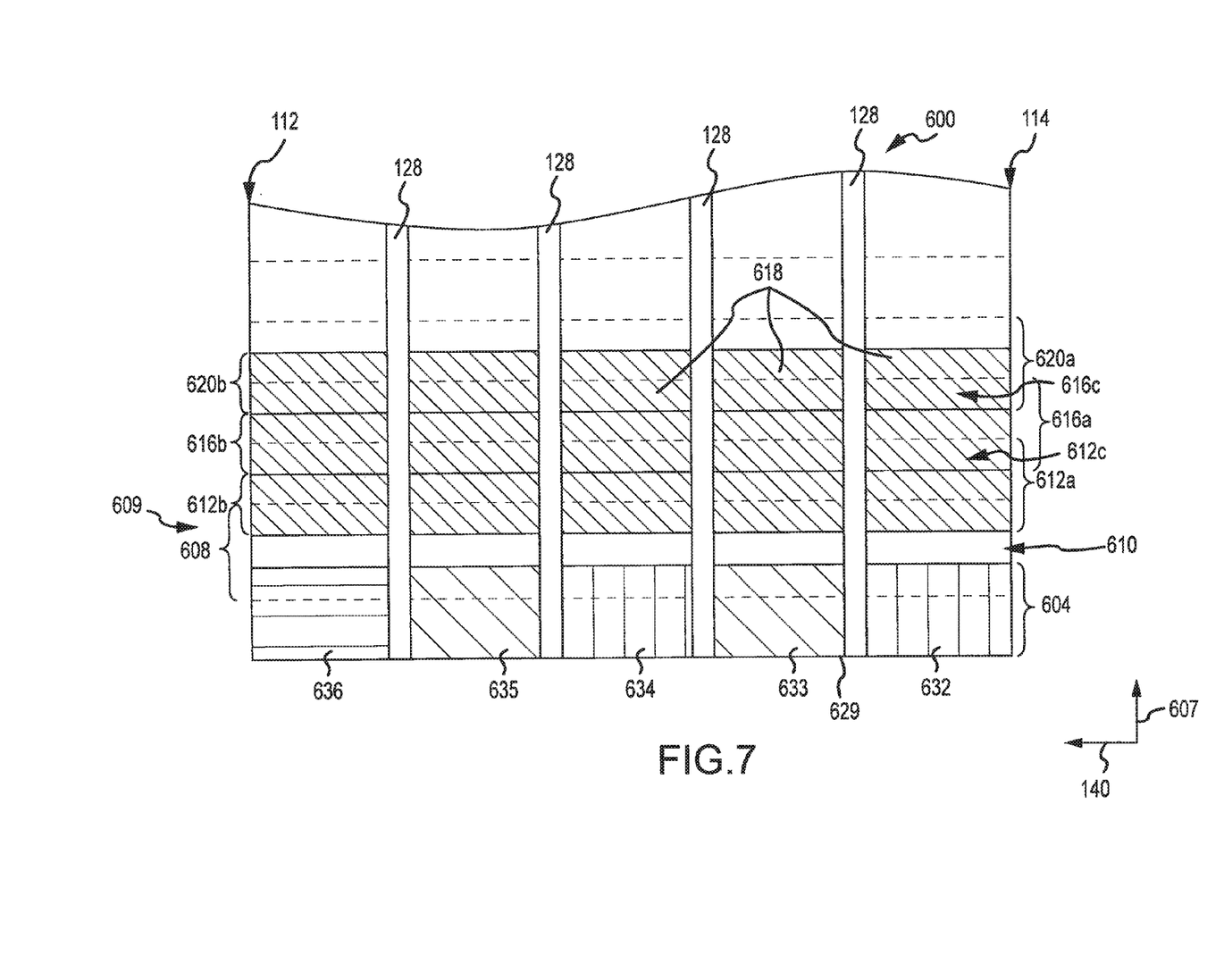
FIG. 7 is close-up view of a portion of another data band of the schematic diagram of FIG. 2.

With reference now to FIGS. 6-7, respective schematic views illustrate the manner in which first and second DBs 120 (e.g., DB5 and DB1 in FIG. 2) may accommodate both a plurality of shingled physical wraps 116 for data storage as well as at least one non-shingled physical wrap (e.g., non-shingled physical wraps 144, 146 of FIG. 2) each of which may serve as a file directory for data stored in the shingled physical wraps 116. Turning first to FIG. 6, a portion of a DB 500 (e.g., DB5 in FIG. 2) includes at least one non-shingled physical wrap 504 (e.g., non-shingled physical wrap 144 in FIG. 2) including a plurality of partitions (e.g., such as but not limited to partitions 532-536). In one arrangement, the non-shingled physical wrap 504 may be located adjacent an upper edge 529 of the DB 500. The DB 500 also includes a number of initial physical wraps 512a, 516a, 520a and the like that may be written (e.g., by head assembly 23) over the surface of the magnetic tape pack 100 starting at the BOT 112 and extending in the forward direction 136 to or towards the EOT 114 within a plurality of partitions 518 (and in direction 507 away from centerline 148 (not shown in FIG. 6) and towards lower edge 108 (also not shown in FIG. 6)). As with the DBs 300, 400 of FIGS. 4, 5, each of initial physical wraps 516a, 520a, and the like respectively overlap immediately preceding initial physical wraps over respective overlap portions 512c, 512c, and the like resulting in respective residual physical wraps 512b, 516b, and the like which collectively represent a user data portion 509 including actual data that may be subsequently read by head assembly 23.

Each of the partitions 532-536 (and/or other partitions) of the non-shingled physical wrap 504 may be dynamically or randomly writeable free of disturbing (e.g., erasing, modifying, and the like) data in the user data portion 509 due to the provision of at least one buffer zone or gap 510 extending along a length of the DB 500 and thus the magnetic tape pack 100 that separates the non-shingled physical wrap 504 from the user data portion 509. In one arrangement, the gap 510 may be created by way of appropriately programming the controller 18 of FIG. 1 to not write data along what would otherwise be an initial physical wrap 508 (shown in dotted lines for purposes of discussion). Stated differently, the first shingled physical wrap 116 of DB 500 (e.g., DB5 in FIG. 2) may begin with initial physical wrap 512a (e.g., which would corresponding to initial physical wrap 312a in FIG. 4) which results in the gap 510 between the non-shingled physical wrap 504 and the residual physical wrap 512b (and thus the user data portion 509 as a whole). As shown, the gap 510 may have a width that is less than a width of the wraps 504, 512a, 516c, and the like (e.g., due to the overlapping nature of the wraps 512a, 516a combined with the intentional abstaining from writing what would otherwise be initial physical wrap 508)

With reference to FIG. 6, each of the partitions 532-536 in the non-shingled physical wrap 504 has been hashed differently to illustrate that each of such partitions 532-536 may be independently dynamically writable (and readable) as opposed requiring sequentially written data as a stream. For instance, assume that at any appropriate time, the head assembly 23 (e.g., via the controller 18, interface 21, host 20, and/or the like) writes file metadata into the partitions 532-536 that describes and/or facilitates access to data stored in the user data portion 509. At some time later, it may become necessary to replace or at least modify some of the previously written file metadata in one or more of the partitions 532-536 of the non-shingled physical wrap 504. For instance, assume that the file metadata in partition 534 needs to be rewritten (e.g., to add other addresses where related data is stored in the user data portion 509). In this regard, the file metadata in partition 534 can be dynamically rewritten in a manner free of modifying or erasing both file metadata in any of the other partitions of the non-shingled physical wrap 504 (e.g., such as data in directly adjacent partitions 533, 535) as well as data in user data portion 509. Furthermore, the updated data need not necessarily be appended to the end of most recently written file metadata in the non-shingled physical wrap 504 (which may be one or more partitions away from partition 534). While it appears in FIG. 6 that the file metadata consumes an entirety of each of the partitions 532-536 from a first or upper edge 529 of the DB 500 all the way to the gap 510, it should be appreciated that the file metadata may not necessarily consume such an entirety (e.g. may not consume portions of the partitions 532-536 near the gap 510) due to limitations with the head assembly 23 and the like as discussed above in relation to the reasoning behind the ability to perform shingling of wraps in the user data portion 509.

Turning now to FIG. 7, a portion of a DB 600 (e.g., DB1 in FIG. 2) includes at least one non-shingled physical wrap 604 (e.g., non-shingled physical wrap 146 in FIG. 2) including a plurality of partitions (e.g., such as but not limited to partitions 632-636). In one arrangement, the non-shingled physical wrap 604 may be located adjacent a lower edge 629 of the DB 600. The DB 600 also includes a number of initial physical wraps 612a, 616a, 620a and the like that may be written (e.g., by head assembly 23) over the surface of the magnetic tape pack 100 starting at the EOT 114 and extending in the reverse direction 140 to or towards the BOT 112 within a plurality of partitions 618 (and in direction 607 away from centerline 148 (not shown in FIG. 7) and towards upper edge 104 (also not shown in FIG. 7)). As with the DBs 300, 400 and 500 of FIGS. 4, 5 and 6, each of initial physical wraps 616a, 620a, and the like respectively overlap immediately preceding initial physical wraps over respective overlap portions 612c, 612c, and the like resulting in respective residual physical wraps 612b, 616b, and the like which collectively represent a user data portion 609 including actual data that may be subsequently read by head assembly 23. Like the DB 500, the DB 600 includes a buffer or gap 610 between the non-shingled physical wrap 604 and the user data portion 609 which allows each of the partitions 632-636 (and/or other partitions) of the non-shingled physical wrap 604 to be dynamically writable (and readable) to add new file metadata and/or modify existing file metadata.

Figure 8:
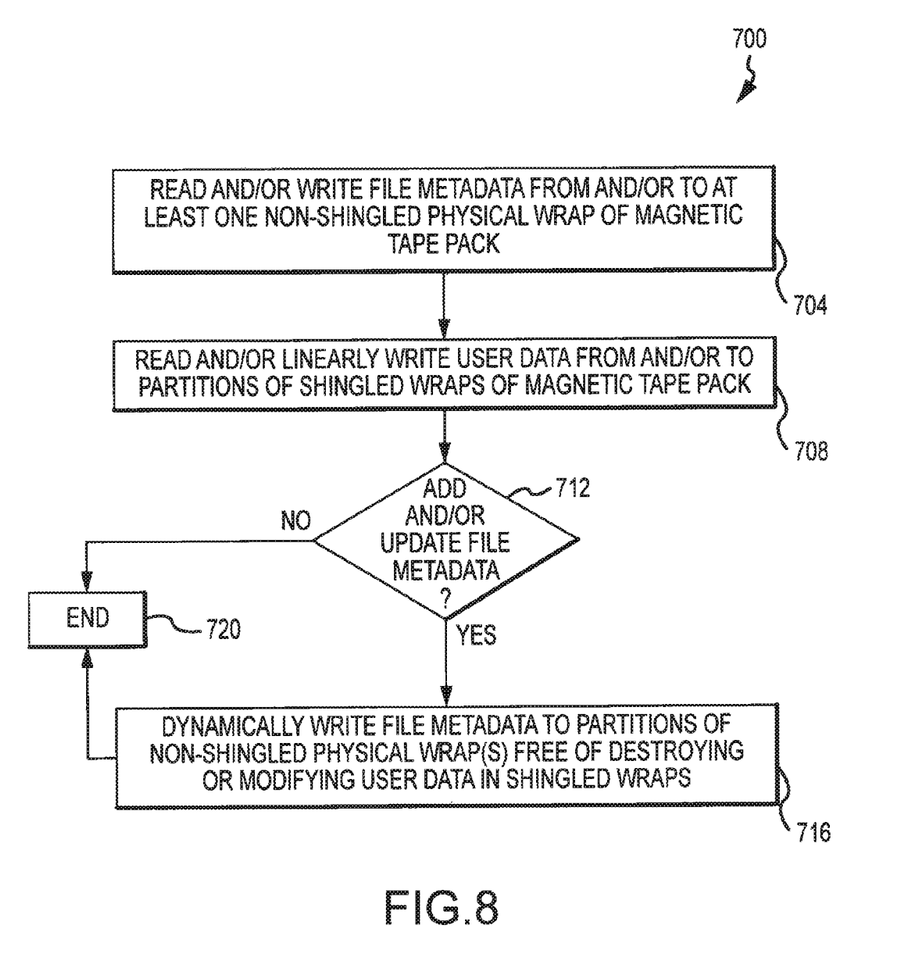
FIG. 8 is a flowchart illustrating a method for use with the partitioning format of FIG. 2.

As discussed above, the non-shingled physical wraps 504, 604 may be located on the surface of the magnetic tape pack over what would otherwise be the first logical written wraps of the magnetic tape pack 100 (e.g., to increase the speed at which the head assembly 23 can access the file directory(ies) in the non-shingled physical wrap 504, 604). Turning now to FIG. 8, a method 700 for use with a magnetic tape pack having shingled and non-shingled wraps will now be discussed. At 704, a head assembly may read and/or write file metadata from or to at least one non-shingled physical wrap of the magnetic tape pack. For instance, assume DB 500 of FIG. 5 represents DB5 of FIG. 2 and DB 600 of FIG. 6 represents DB1 of FIG. 2. In this regard, the head assembly 23 may read and/or write file metadata from or two the partitions 532-536 of non-shingled physical wrap 504 in the forward direction 136 and/or the partitions 632-636 of non-shingled physical wrap 604 in the reverse direction 140.

At 708, the head assembly 23 may proceed to read and/or linearly write data from or along partitions of one or more shingled wraps of the magnetic tape pack in any appropriate manner, such as with use of file directory metadata gleaned during the first and/or second logical wraps. As just one example, the head assembly 23 may proceed to linearly write data according to the method 200 of FIG. 3 (discussed above). Of course, the head assembly 23 may read and linearly write data in numerous other manners consistent with the teachings presented herein. At 712, the method 700 may query Whether it is necessary to add and/or update any file directory metadata for data stored in the shingled wraps. In response to an affirmative answer to the query 712, the method 700 may proceed to dynamically write 716 file metadata to one or more partitions of the at least one non-shingled physical wrap free of destroying or modifying data stored in the shingled wraps. In any event, the method 700 may end at 720.

It will be readily appreciated that many additions and/or deviations may be made from the specific embodiments disclosed in the specification without departing from the spirit and scope of the invention and that the illustrations and discussion herein has only been provided to assist the reader in understanding the various aspects of the present disclosure. For instance, while the magnetic tape pack 100 has been illustrated as having eight DBs, five partitions per physical wrap, and the like, these have only been provided as an example to assist the reader in understanding the partitioning format disclosed herein; numerous other arrangements (e.g., more or fewer than eight DBs, more or fewer than five partitions per physical wrap, and the like) are envisioned that may utilize the disclosed partitioning format (i.e., the disclosed arrangement of a linearly or sequentially written user data portion on a magnetic tape pack made up of a plurality of shingled physical wraps in addition to at least one non-shingled physical wrap on the magnetic tape pack into which file metadata for data in the user data portion may be dynamically written free of modifying or erasing data in the user data portion). Furthermore, while the magnetic tape pack 100 has been discussed in the context of a spiral-out manner of writing and reading in relation to respective pairs of DBs, numerous other manners of writing and reading are envisioned, all of which may utilize the partitioning format disclosed herein. Furthermore, one or more various combinations of the above discussed arrangements and embodiments are also envisioned.

Embodiments disclosed herein can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a non-volatile memory device, a composition of matter affecting a machine-readable propagated signal, or a combination of one or more of them. In this regard, the host 20 may encompass one or more apparatuses, devices, and machines for processing data, including by way of example a programmable processor, a computer, or multiple processors or computers. In addition to hardware, the host 20, controller 18, and the like may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein (e.g., reading data, writing data, and the like) can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

I claim:

1. A magnetic tape, comprising:
 a plurality of shingled wraps disposed between upper and lower edges of the magnetic tape, wherein each shingled wrap extends along the length of magnetic tape, and wherein each shingled wrap is divided into a plurality of partitions;
 at least a first non-shingled wrap extending along the length of the magnetic tape, wherein the first non-shingled wrap is divided into a plurality of partitions; and
 a plurality of data bands disposed between the upper and lower edges of the magnetic tape, wherein each data band extends along the length of magnetic tape, wherein each data band comprises a subset of the plurality of shingled wraps, wherein at least a first of the data bands comprises the first non-shingled wrap, wherein the plurality of shingled wraps are adapted to include sequentially written data, and wherein the first non-shingled wrap is adapted to include dynamically written data.

2. The magnetic tape of claim 1, wherein each shingled wrap is divided into a plurality of partitions in a direction that is generally perpendicular to the length of the magnetic tape.

3. The magnetic tape of claim 1, wherein the first data band further comprises a gap between the first non-shingled wrap and the subset of the shingled wraps of the first data band, and wherein the gap is free of data and generally extends along the length of the magnetic tape.

4. The magnetic tape of claim 3, wherein each wrap comprises a wrap width, wherein the gap comprises a gap width, and wherein the gap width is less than the wrap width.

5. The magnetic tape of claim 1, wherein at least a second of the data bands comprises a second non-shingled wrap.

6. The magnetic tape of claim 5, wherein each of the first and second data bands comprises upper and lower edges, wherein the first non-shingled wrap is disposed adjacent one of the upper and lower edges of the first data band, and wherein the second non-shingled wrap is disposed adjacent the other of the upper and lower edges of the second data band.

7. The magnetic tape of claim 1, wherein at least some of the data bands are free of non-shingled wraps.

8. The magnetic tape of claim 1, further comprising:
 a plurality of guard bands, wherein each guard band extends in a direction extending between the upper and lower edges of the magnetic tape, and wherein the plurality of guard bands divides the magnetic tape into a plurality of data sections.

9. A method, comprising:
writing data to at least one partition of the non-shingled wrap of the magnetic tape of claim 1 free of modifying data in the shingled wraps.

10. The method of claim 9, further comprising:
inserting a tape cartridge including the magnetic tape into a tape drive; and
using the tape drive to perform the writing step.

11. A tape drive, comprising:
a head assembly that is adapted to write data to and read data from the magnetic tape of claim 1; and
a controller in communication with the head assembly, wherein the controller is adapted to cause the head assembly to linearly write data to at least one partition of at least one of the shingled wraps of the magnetic tape, and wherein the controller is adapted to cause the head assembly to dynamically write data to at least one partition of the at least one non-shingled wrap of the magnetic tape.

12. The tape drive of claim 11, wherein the dynamically written data comprises file directory metadata for the linearly written data.

13. A method for writing data to magnetic tape that includes a plurality of data bands arranged between upper and lower edges of the magnetic tape, wherein each data band extends along a length of the magnetic tape and comprises a plurality of physical wraps extending along the length of the magnetic tape, the method comprising:
first linearly writing data along partitions of one physical wrap of a first of the data bands in a forward direction of the magnetic tape;
second linearly writing data along partitions of another physical wrap of a second of the data bands in a reverse direction of the magnetic tape, the reverse direction being opposite from the forward direction;
continuing to alternatively perform the first and second linearly writing steps, wherein each successive physical wrap written in the first writing step is closer to the lower edge than is the immediately preceding written physical wrap, wherein each successive physical wrap written in the second writing step is closer to the upper edge than is the immediately preceding written physical wrap; and
dynamically writing data along at least one partition of a physical wrap of at least one of the first and second data bands, the dynamically written data comprising file directory metadata corresponding to data written during the first and second linearly writing steps.

14. The method of claim 13, wherein the dynamically writing step occurs free of modifying data written during the first linearly writing, second linear writing, and continuing steps.

15. The method of claim 13, wherein data written during the first linearly writing, second linear writing, and continuing steps is appended to the end of the most recently written data.

16. The method of claim 13, wherein the one physical wrap of the first data band in the first linearly writing step is shingled, wherein the another physical wrap of the second data band in the second linearly writing step is shingled, and wherein the physical wrap of at least one of the first and second data bands in the dynamically writing step is non-shingled.

17. The method of claim 13, further comprising, responsive to writing data to all physical wraps of the first and second data bands:
third linearly writing data along partitions of one physical wrap of a third of the data bands in the forward direction of the magnetic tape;
fourth linearly writing data along partitions of another physical wrap of a fourth of the data bands in the reverse direction of the magnetic tape,
continuing to alternatively perform the third and fourth linearly writing steps, wherein each successive physical wrap written in the third writing step is closer to the lower edge than is the immediately preceding written physical wrap, wherein each successive physical wrap written in the fourth writing step is closer to the upper edge than is the immediately preceding written physical wrap.

18. A method for writing data to magnetic tape, comprising:
linearly writing user data into at least one partition of at least one shingled wrap of one of a plurality of data bands of the magnetic tape;
dynamically writing file directory metadata for the user data into at least one partition of at least one non-shingled wrap of one of a plurality of data bands of the magnetic tape, wherein the dynamically writing step occurs free of modifying the user data;
reading the at least one partition of the non-shingled wrap to obtain the file directory metadata; and
locating the user data in the at least one shingled wrap using the file directory metadata.

19. The method of claim 18, wherein the dynamically writing step comprises dynamically writing first file directory metadata into at least a first partition of the at least one non-shingled wrap, wherein the at least one non-shingled wrap comprises at least a second partition directly adjacent the first partition, wherein the second partition comprises second file directory metadata, and wherein the dynamically writing step occurs free of modifying the second file directory metadata.

* * * * *

UNITED STATES PATENT AND TRADEMARK OFFICE
CERTIFICATE OF CORRECTION

| | | |
|---|---|---|
| PATENT NO. | : 8,665,563 B2 | Page 1 of 1 |
| APPLICATION NO. | : 13/440054 | |
| DATED | : March 4, 2014 | |
| INVENTOR(S) | : Hostetter | |

It is certified that error appears in the above-identified patent and that said Letters Patent is hereby corrected as shown below:

In the Specification

In column 10, line 57, delete "BUT 112" and insert -- BOT 112 --, therefor.

In column 10, line 57, delete "FOT 114" and insert -- EOT 114 --, therefor.

In column 13, line 12, delete "508)" and insert -- 508). --, therefor.

In column 14, line 32, delete "Whether" and insert -- whether --, therefor.

Signed and Sealed this
Eighth Day of July, 2014

Michelle K. Lee
*Deputy Director of the United States Patent and Trademark Office*